(12) United States Patent
Xie et al.

(10) Patent No.: US 10,997,477 B2
(45) Date of Patent: May 4, 2021

(54) FOREIGN MATTER RECOGNITION METHOD AND DEVICE

(71) Applicant: BEIJING XIAOMI MOBILE SOFTWARE CO., LTD., Beijing (CN)

(72) Inventors: Yan Xie, Beijing (CN); Longxiang Wan, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 121 days.

(21) Appl. No.: 16/041,906

(22) Filed: Jul. 23, 2018

(65) Prior Publication Data

US 2019/0065915 A1 Feb. 28, 2019

(30) Foreign Application Priority Data

Aug. 23, 2017 (CN) .......................... 201710731063.8

(51) Int. Cl.

| | |
|---|---|
| *G06K 9/78* | (2006.01) |
| *D06F 33/00* | (2020.01) |
| *G06T 7/50* | (2017.01) |
| *G06K 9/32* | (2006.01) |
| *G06T 7/90* | (2017.01) |
| *D06F 37/42* | (2006.01) |
| *D06F 34/18* | (2020.01) |

(52) U.S. Cl.
CPC .............. *G06K 9/78* (2013.01); *D06F 33/00* (2013.01); *G06K 9/3241* (2013.01); *G06T 7/50* (2017.01); *G06T 7/90* (2017.01); *D06F 34/18* (2020.02); *D06F 37/42* (2013.01); *D06F 2202/10* (2013.01); *D06F 2204/10* (2013.01)

(58) Field of Classification Search
None
See application file for complete search history.

(56) References Cited

U.S. PATENT DOCUMENTS

| | | | |
|---|---|---|---|
| 7,585,825 B2 * | 9/2009 | Artiga Gonzalez ... | C11D 1/662 510/101 |
| 9,745,688 B2 * | 8/2017 | Ashrafzadeh ............ | D06F 58/30 |
| 2008/0074262 A1 * | 3/2008 | Paulkovich .......... | G06Q 10/087 340/572.1 |

(Continued)

FOREIGN PATENT DOCUMENTS

| | | |
|---|---|---|
| CN | 204491242 U | 7/2015 |
| CN | 105420987 A | 3/2016 |

(Continued)

OTHER PUBLICATIONS

DE 102014002837 A1 ; English machine translation ; Aug. 27, 2015 by Zekjiri et al (Year: 2015).*

(Continued)

*Primary Examiner* — Nancy Bitar
(74) *Attorney, Agent, or Firm* — Arch & Lake LLP

(57) ABSTRACT

The present disclosure provides a foreign matter recognition method and device. The method includes: detecting whether a garment to be washed that is placed in a washing device meets a foreign matter recognition condition; in the case that the garment to be washed meets the foreign matter recognition condition, recognizing that a foreign matter exists in the garment to be washed; and indicating existence of the foreign matter.

15 Claims, 10 Drawing Sheets

(56) References Cited

U.S. PATENT DOCUMENTS

| | | | | |
|---|---|---|---|---|
| 2008/0074362 A1* | 3/2008 | Ogura | ................. | G09G 3/3275 |
| | | | | 345/77 |
| 2010/0205820 A1* | 8/2010 | Ashrafzadeh | ........ | G01N 21/255 |
| | | | | 34/389 |
| 2011/0156899 A1 | 6/2011 | Lauer | | |
| 2017/0064778 A1* | 3/2017 | Liu | ........................ | H05B 6/666 |
| 2017/0321370 A1 | 11/2017 | Ashrafzadeh | | |

FOREIGN PATENT DOCUMENTS

| | | |
|---|---|---|
| DE | 102014002837 A1 | 8/2015 |
| WO | 2010017138 A1 | 2/2010 |
| WO | WO2018121392 * | 12/2017 |
| WO | 2018228860 A1 | 12/2018 |

OTHER PUBLICATIONS

Supplementary European Search Report in the European application No. 18189853.7, dated Feb. 12, 2019.

First Office Action issued to Chinese Patent Application No. 201710731063.8, dated Oct. 22, 2019 and English translation, (16p).

First Office Action issued to the European Application No. 18189853.7 dated Jul. 3, 2020, (5p).

\* cited by examiner

FOREIGN MATTER RECOGNITION METHOD AND DEVICE

CROSS-REFERENCE TO RELATED APPLICATIONS

This application is based upon and claims priority to Chinese Patent Application No. 201710731063.8, filed on Aug. 23, 2017, the entire content of which is incorporated herein by reference for all purposes.

TECHNICAL FIELD

The present disclosure generally relates to the technical field of computers, and more particularly, to a foreign matter recognition method and device.

BACKGROUND

Washing devices such as laundry washers have become a main tool for garment washing for most people. However, some careless users may forget to check or miss checking about whether there are foreign matters such as keys, coins and mobile phones in pockets when garments are washed. Those foreign matters may damage garments inside the washing devices and may even damage the washing devices when the washing devices are used to wash the garments.

SUMMARY

The present disclosure provides a method, a device and a non-transitory computer-readable medium for recognizing a foreign matter.

According to a first aspect of the present disclosure, there is provided a foreign matter recognition method, which may include: detecting whether a garment to be washed that is placed in a washing device meets a foreign matter recognition condition; in the case that the garment to be washed meets the foreign matter recognition condition, recognizing that a foreign matter exists in the garment to be washed; and indicating existence of the foreign matter.

According to a second aspect of the present disclosure, there is provided a foreign matter recognition device, which may include: a processor; and a memory arranged to store an instruction executable for the processor, where the processor may be arranged to: detect whether a garment to be washed that is placed in a washing device meets a foreign matter recognition condition; in the case that the garment to be washed meets the foreign matter recognition condition, recognize that a foreign matter exists in the garment to be washed; and indicate existence of the foreign matter.

According to a third aspect of the present disclosure, there is provided a non-transitory computer-readable storage medium having stored thereon instructions that, when executed by a processor, cause the processor to implement detecting whether a garment to be washed that is placed in a washing device meets a foreign matter recognition condition; in the case that the garment to be washed meets the foreign matter recognition condition, recognizing that a foreign matter exists in the garment to be washed; and indicating existence of the foreign matter.

It should be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the present disclosure.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples of the present disclosure. Also, common but well-understood elements that are useful or necessary in a commercially feasible example are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION

Reference will now be made in detail to examples, examples of which are illustrated in the accompanying drawings. The following description refers to the accompanying drawings in which the same numbers in different drawings represent the same or similar elements unless otherwise represented. The implementations set forth in the following description of examples do not represent all implementations consistent with the present disclosure. Instead, they are merely examples of apparatuses and methods consistent with aspects related to the present disclosure.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Figure 1:
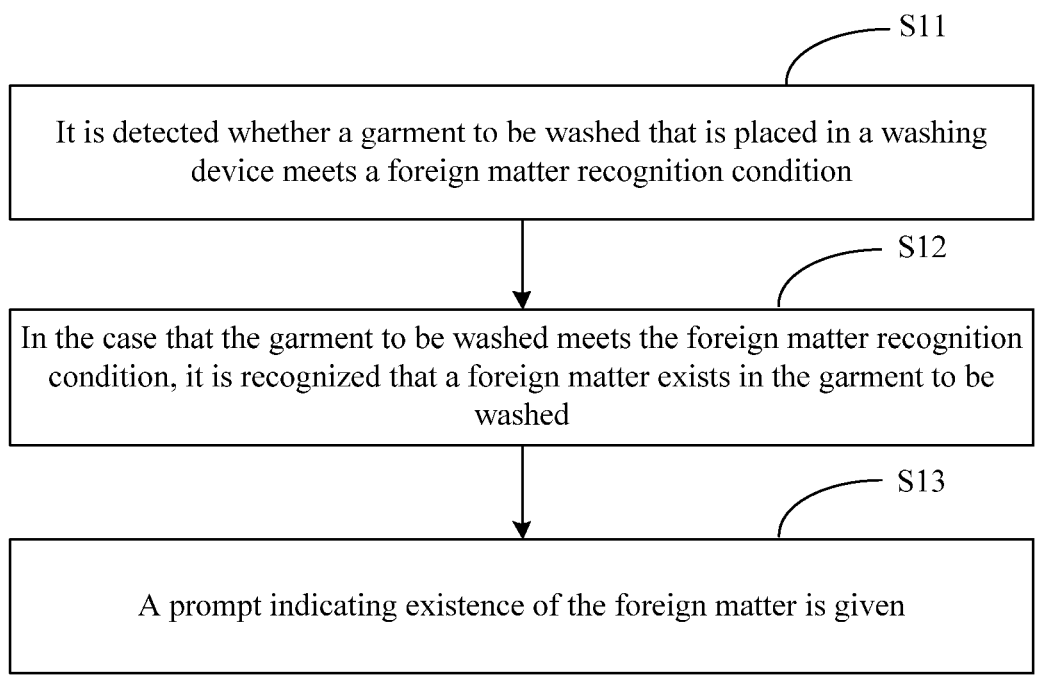
FIG. 1 is a flow chart showing a foreign matter recognition method, according to an example.

FIG. 1 is a flow chart showing a foreign matter recognition method, according to an example. A foreign matter referred herein may be one or more items left in the garments when the garments are washed. The example of a foreign matter may include a key, a coin, a mobile phone or the like. As shown in FIG. 1, the method is applied to a washing device (for example, a smart washing machine). The foreign matter recognition method according to the example of the present disclosure includes the following steps.

In Step S11, it is detected whether a garment to be washed that is placed in the washing device meets a foreign matter recognition condition.

For example, when a user places the garment to be washed in the washing device (for example, the smart washing machine) for washing, the washing device may detect the garment to be washed. In such a manner, whether the garment to be washed meets the foreign matter recognition condition may be determined or judged.

Figure 2:
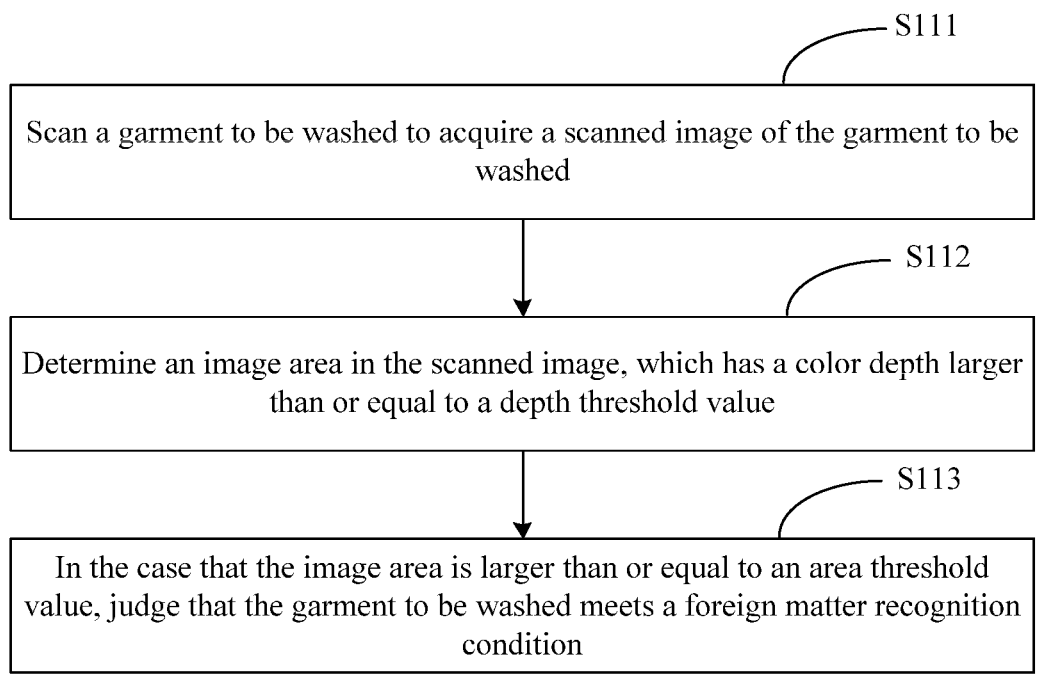
FIG. 2 is a flow chart showing Step S11 in a foreign matter recognition method, according to an example.

FIG. 2 is a flow chart showing Step S11 in a foreign matter recognition method, according to an example. In a possible implementation mode, as shown in FIG. 2, Step S11 may include the following steps.

In Step S111, the garment to be washed is scanned to acquire a scanned image of the garment to be washed.

In a possible implementation mode, the garment to be washed may be scanned to acquire the scanned image of the garment to be washed through X rays.

For example, the washing device may include an X ray scanning function, and may perform X ray scanning on the garment to be washed, thereby acquiring the scanned image of the garment to be washed. Those skilled in the art should know that the garment to be washed may be scanned in multiple manners, for example, an ultrasonic wave, as long as the scanned image of the garment to be washed may be acquired, which will not be limited in the present disclosure.

In a possible implementation mode, the washing device may scan the garment to be washed through a parallel X ray scanning function, herein the parallel X ray scanning function may refer to that the garment to be washed may be structurally subjected to X ray scanning and then enter the washing device.

For example, the washing device may include an inlet, herein the inlet may be arranged for the garment to be washed to enter the washing device. The washing device may further include a parallel X ray scanning part, and before entering the washing device, the garment to be washed of the user may pass through the parallel X ray scanning part at first (for example, the parallel X ray scanning part is arranged in front of the inlet), so that scanning of the garment to be washed by the washing device is implemented. For example, when being placed in the washing device by the user, the garment to be washed may pass through the parallel X ray scanning part in front of the inlet and enter the washing device (for example, a drum of the smart washing machine) from the inlet.

In such a manner, the washing device may scan the garment to be washed through the parallel X ray scanning part and acquire the scanned image of the garment to be washed.

In a possible implementation mode, the washing device may scan the garment to be washed through an embedded X ray scanning function, herein the embedded X ray scanning function may refer to that an X ray scanning part is arranged on a machine body of the washing device.

For example, the X ray scanning part may be arranged on a housing of the washing device. When the user places the garment to be washed in the washing device, the washing device may scan the garment to be washed through the X ray scanning part and acquire the scanned image of the garment to be washed.

In such a manner, the washing device may scan the garment to be washed directly through the embedded X ray scanning function, thereby ensuring that the washing device is simple in structure and small in size.

Those skilled in the art should know that multiple realization manners may be adopted for the X ray scanning function, and a structure and position of the X ray scanning part and a manner in which the garment to be washed enters the washing device may also be set according to a requirement, as long as the garment to be washed may be scanned and the scanned image of the garment to be washed may be acquired. There are no limits made in the present disclosure.

In Step S112, an image area in the scanned image that has a color depth larger than or equal to a depth threshold value is determined.

In Step S113, in the case that the image area has an area value larger than or equal to an area threshold value, it is judged that the garment to be washed meets the foreign matter recognition condition.

Figure 3:
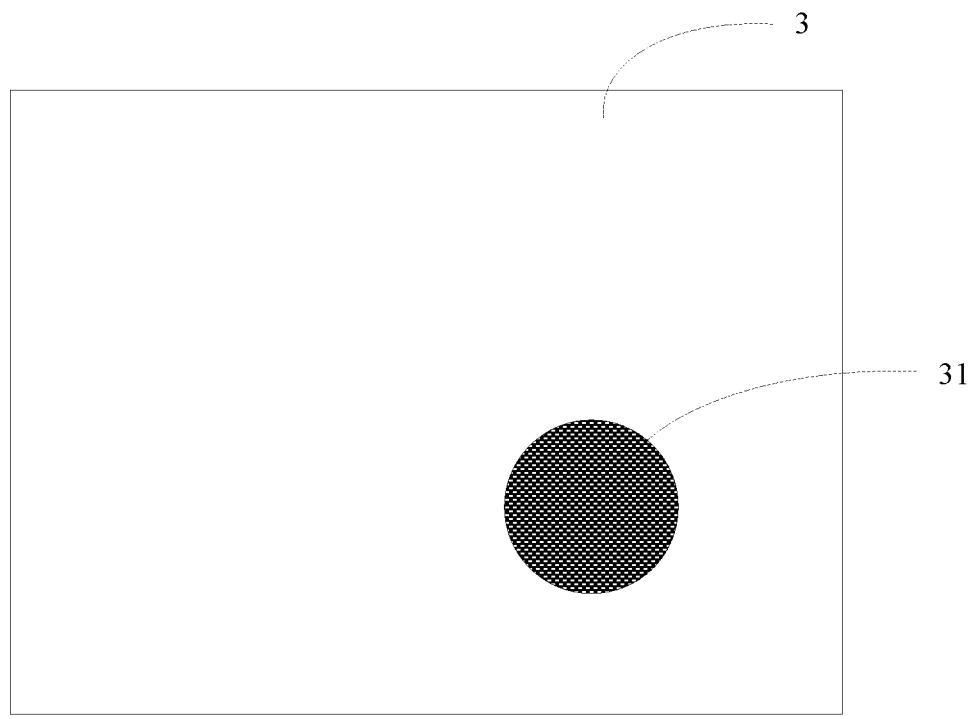
FIG. 3 is a schematic diagram illustrating a scanned image of a garment to be washed in a foreign matter recognition method, according to an example.

FIG. 3 is a schematic diagram illustrating a scanned image of a garment to be washed in a foreign matter recognition method, according to an example. In a possible implementation mode, as shown in FIG. 3, the washing device may recognize a characteristic of the scanned image through an image recognition function.

For example, the washing device may recognize a color characteristic of the scanned image 3 and determine the image area 31 of which the color depth is larger than or equal to the depth threshold value (for example, 50%) in the scanned image 3, herein a color depth of the scanned image 3 is 0-100% from all white to all black. Those skilled in the art should know that the image area in the scanned image that has a color depth larger than or equal to the depth threshold value may be determined through the related technology, for example, an image recognition technology, which will not be limited in the present disclosure. In addition, the depth threshold value may be set by a system as a default, and may also be selected and set by the user according to a personal requirement. A specific setting manner and range of the depth threshold value will not be limited in the present disclosure.

In a possible implementation mode, when the image area has an area value larger than or equal to an area threshold value, it may be judged that the garment to be washed meets the foreign matter recognition condition. For example, as shown in FIG. 3, when the recognized image area 31 of which the color depth is larger than or equal to the depth threshold value is larger than the area threshold value (for example, 30 square centimeters), it may be judged that the garment to be washed meets the foreign matter recognition condition. Those skilled in the art should know that a specific numerical value of the area threshold value may be set by the system as a default, and may also be set by the user according to a requirement. The area threshold value may be a specific numerical value, and may also be determined according to a proportion of a total area of the scanned image (for example, the total area of the scanned image is 100%, and the area threshold value is a numerical value which is 5% of the total area of the scanned image), as long as it may be judged that the garment to be washed meets the foreign matter recognition condition when the image area has an area value larger than or equal to the area threshold value. There are no limits made in the present disclosure.

In a possible implementation mode, the characteristic of the scanned image may further be recognized and analyzed, thereby judging whether the garment to be washed meets the foreign matter recognition condition. For example, foreign matter recognition may be performed according to features of scanned images obtained by scanning different materials and components (for example, the scanned images obtained by scanning different materials and components are different in color) as characteristics, and foreign matter recognition may also be performed according to features of scanned images corresponding to structures and shapes of foreign matters as characteristics. In such a manner, whether the garment to be washed meets the foreign matter recognition condition may be accurately judged on the basis of the characteristic of the scanned image. Those skilled in the art should know that foreign matter recognition condition judgment may be performed according to one characteristic or multiple characteristics of the scanned image, as long as whether the garment to be washed meets the foreign matter recognition condition may be judged on the basis of the characteristic of the scanned image. There are no limits made in the present disclosure.

Figure 4:
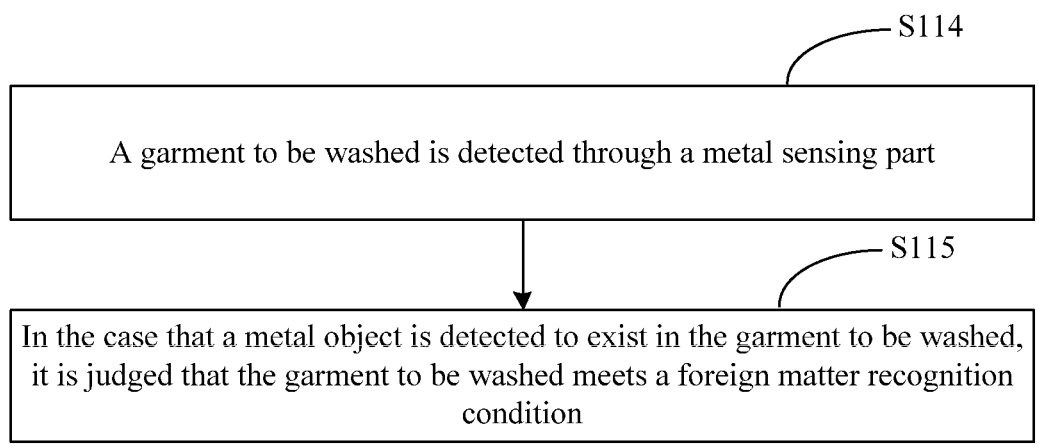
FIG. 4 is a flow chart showing Step S11 in a foreign matter recognition method, according to an example.

FIG. 4 is a flow chart showing Step S11 in a foreign matter recognition method, according to an example. In a possible implementation mode, as shown in FIG. 4, Step S11 may further include the following steps.

In Step S114, the garment to be washed is detected through a metal sensing part.

For example, the garment to be washed may be detected through the metal sensing part capable of sensing a metal. In such a manner, whether a metal object exists in the garment to be washed may be detected.

Figure 5:
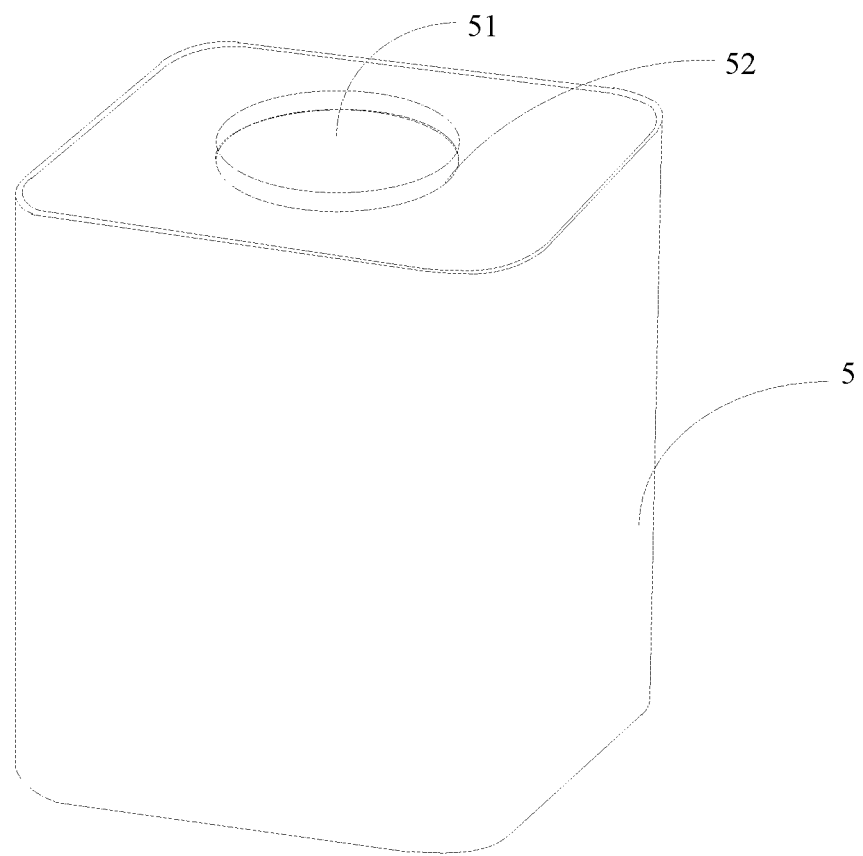
FIG. 5 is a schematic diagram illustrating a washing device of a foreign matter recognition method, according to an example.

FIG. 5 is a schematic diagram illustrating a washing device of a foreign matter recognition method, according to an example. In a possible implementation mode, as shown in FIG. 5, the metal sensing part 52 may be a magnetic sensing coil, a metal detection loop and the like.

For example, the washing device 5 may include an inlet 51, and the inlet 51 is arranged for the user to place the garment to be washed. The metal sensing part 52 (for example, the metal detection loop capable of sensing a metal) may be arranged at the inlet 51. In such a manner, when the user places the garment to be washed in the washing device, the garment to be washed may be detected through the metal sensing part. Those skilled in the art should know that a structure, type and position of the metal sensing part may be set according to a requirement, as long as the garment to be washed may be detected, which will not be limited in the present disclosure.

In Step S115, in the case that a metal object is detected to exist in the garment to be washed, it is judged that the garment to be washed meets the foreign matter recognition condition.

For example, when the metal object (for example, a key, a mobile phone and a coin) exists in the garment to be washed that is placed in the washing device 5 by the user, the metal sensing part 52 of the washing device 5 may detect that the metal object exists in the garment to be washed, thereby judging that the garment to be washed meets the foreign matter recognition condition. In such a manner, it may be detected whether the metal object exists in the garment to be washed that is placed in the washing device, and when the metal object is detected to exist, it is judged that the garment to be washed meets the foreign matter recognition condition.

Those skilled in the art should know that whether the garment to be washed that is placed in the washing device meets the foreign matter recognition condition may be detected in multiple manners, not limited to the abovementioned examples. Detection manners of the washing device may include multiple forms. For example, whether the garment to be washed meets the foreign matter recognition condition may be judged only by scanning the garment to be washed and analyzing the scanned image or whether the garment to be washed meets the foreign matter recognition condition may be detected only through the metal sensing part, and whether the garment to be washed meets the foreign matter recognition condition may also be detected through the metal sensing part by scanning the garment to be washed and analyzing the scanned image, as long as whether the garment to be washed that is placed in the washing device meets the foreign matter recognition condition may be detected. There are no limits made in the present disclosure.

As shown in FIG. 1, in Step S12, in the case that the garment to be washed meets the foreign matter recognition condition, it is recognized that a foreign matter exists in the garment to be washed.

For example, when the washing device detects that the garment to be washed that is placed by the user meets the foreign matter recognition condition, the washing device may recognize that the foreign matter exists in the garment to be washed. Those skilled in the art should know that the foreign matter may be recognized to exist in the garment to be washed through the related technology, as long as it may be recognized that the foreign matter exists in the garment to be washed in the case that the garment to be washed meets the foreign matter recognition condition. A specific recognition manner will not be limited in the present disclosure.

In Step S13, a prompt indicating existence of the foreign matter is given.

For example, in the case that the foreign matter is recognized to exist in the garment to be washed, the washing device may suspend work and gives the prompt (for example, a voice prompt) corresponding to existence of the foreign matter to the user to prompt the user for timely checking and handling.

Figure 6:
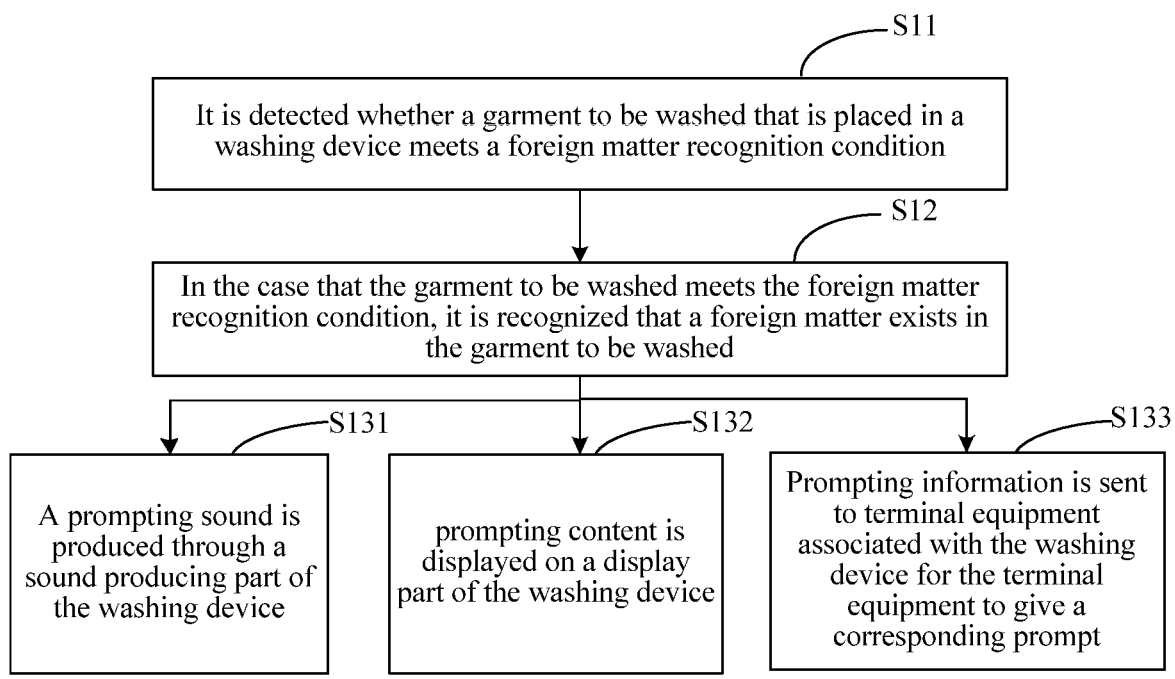
FIG. 6 is a flow chart showing a foreign matter recognition method, according to an example.

FIG. 6 is a flow chart showing a foreign matter recognition method, according to an example. In a possible implementation mode, as shown in FIG. 6, Step S13 may include the following steps.

In Step S131, a prompting sound is produced through a sound producing part of the washing device.

For example, in the case that the garment to be washed meets the foreign matter recognition condition, it may be recognized that the foreign matter exists in the garment to be washed. The prompting sound may be produced through the sound producing part of the washing device. For example, in the case that the foreign matter exists in the garment to be washed that is placed in the smart washing machine by the user, a prompting voice may be produced through own sound producing part (for example, a speaker) of the smart washing machine. For example, "a foreign matter is detected in the garment, please handle it" may be produced. Beeps may be produced for warning prompting through the sound producing part of the smart washing machine. In such a manner, the user may be clearly prompted to check whether the foreign matter exists in the garment to be washed through a voice.

In Step S132, a prompting content is displayed on a display part of the washing device.

For example, in the case that the garment to be washed meets the foreign matter recognition condition, it may be recognized that the foreign matter exists in the garment to be washed. The display part of the washing device may be adopted for display. For example, in the case that the foreign matter exists in the garment to be washed that is placed in the smart washing machine by the user, a corresponding prompting text or abnormity list may be displayed on the display part (for example, a display panel) of the smart washing machine.

In Step S133, prompting information is sent to terminal equipment associated with the washing device for the terminal equipment to give a corresponding prompt.

For example, in the case that the garment to be washed meets the foreign matter recognition condition, it may be recognized that the foreign matter exists in the garment to be washed. The prompting information may be sent to the terminal equipment (for example, a smart mobile phone and a tablet) associated with the washing device for the terminal equipment to give the corresponding prompt (for example, a prompting manner of voice, text, vibration and the like). For example, the smart washing machine may be associated with a smart mobile phone of the user in a manner of Bluetooth (BT), Wireless Fidelity (WIFI), a network signal or the like. In the case that the foreign matter is recognized to exist in the garment to be washed, the washing machine may send the prompting information (the foreign matter exists in the garment to be washed) to the associated smart mobile phone, and the smart mobile phone gives the corresponding prompt. For example, the smart mobile phone may produce a prompting voice and the like.

In such a manner, a foreign matter prompt may be given through the terminal equipment of the user, and foreign matter prompting is remotely and intelligently implemented.

Those skilled in the art should know that the washing device may give the prompt indicating existence of the foreign matter in multiple manners. The prompt may be given in only one manner, for example, the prompting sound is produced through the sound producing part of the washing device, and the prompt may also be given in multiple manners, for example, the prompting sound is produced through the sound producing part of the washing device, and meanwhile, the associated terminal equipment synchronously gives the prompt, as long as the prompt indicating existence of the foreign matter may be given in the case that the foreign matter is recognized to exist in the garment to be washed. There are no limits made in the present disclosure.

According to the example of the present disclosure, it is detected whether the garment to be washed that is placed in the washing device meets the foreign matter recognition condition, and in the case that the foreign matter recognition condition is met, it is recognized that the foreign matter exists in the garment to be washed, and the prompt indicating existence of the foreign matter is given, so that the user is prompted to timely clean the foreign matter in the garment to be washed to avoid damage brought by the foreign matter.

Application Example

An application example according to the example of the present disclosure will be given below for conveniently understanding the flow of the foreign matter recognition method in combination with an exemplary application scenario that "a user places a garment to be washed in a washing machine for washing". Those skilled in the art should know that the below application example is only intended to make the example of the present disclosure conveniently understood, and should not be considered as a limit to the example of the present disclosure.

Figure 7:
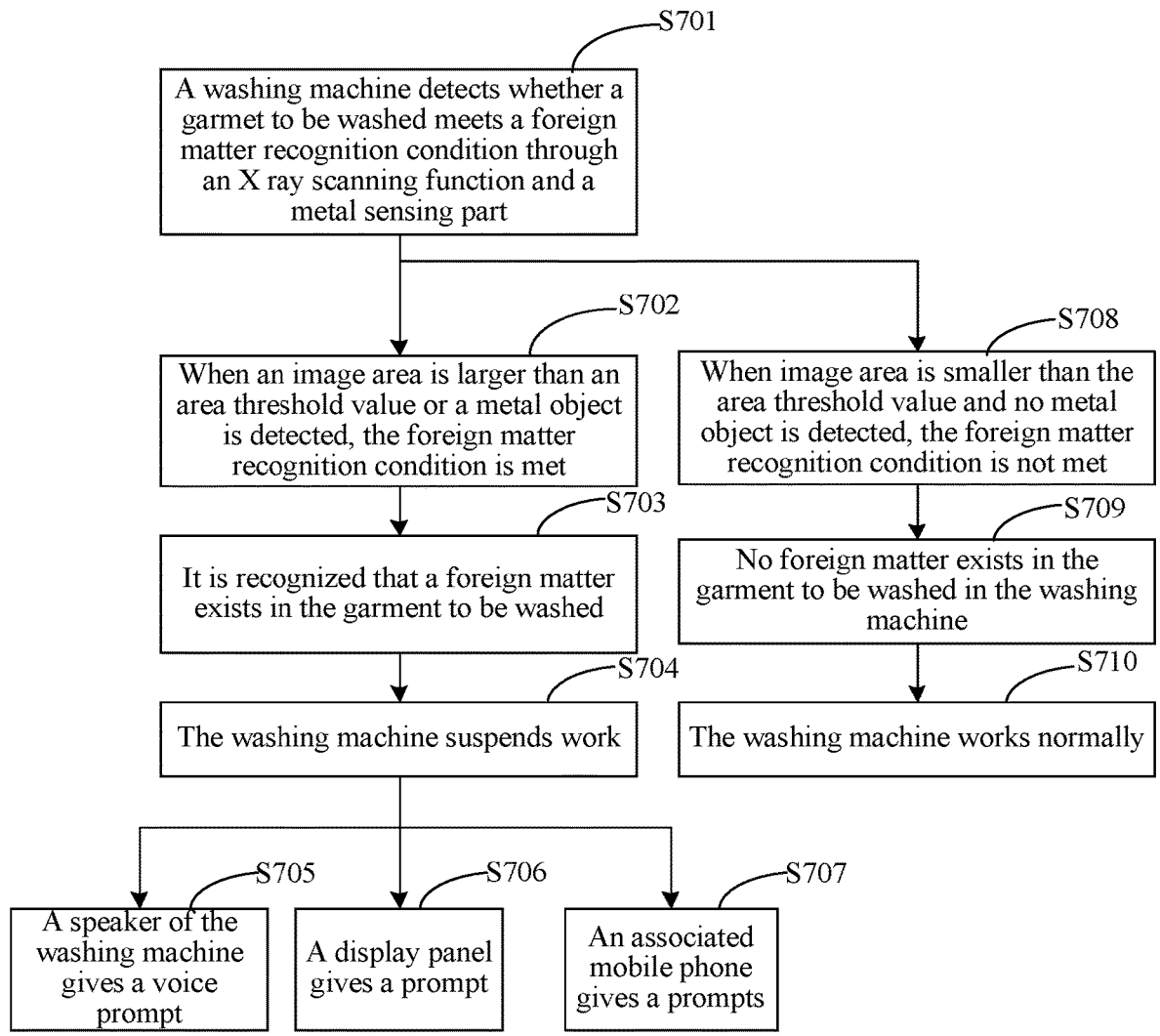
FIG. 7 is a schematic diagram illustrating an application scenario of a foreign matter recognition method, according to an example.

FIG. 7 is a schematic diagram illustrating an application scenario of a foreign matter recognition method, according to an example. As shown in FIG. 7, in the application example, the user places the garment to be washed in the washing machine for washing.

In the application example, the washing machine has both an X ray scanning function (for example, including a parallel or embedded X ray scanning part) and a metal sensing part (for example, a magnetic sensing coil or a metal detection loop is arranged at an inlet of the washing machine). In the application example, when the garment to be washed passes through the inlet of the washing machine, the washing machine may detect whether the garment to be washed meets a foreign matter recognition condition (Step S701). For example, the X ray scanning part may scan the garment to be washed and acquire a scanned image of the garment to be washed.

In the application example, an image recognition function of the washing machine may recognize an image area in the scanned image that has a color depth larger than or equal to a depth threshold value, and when the image area being larger than or equal to an area threshold value, it may be judged that the garment to be washed meets the foreign matter recognition condition. In the application example, the metal sensing part of the washing machine may also detect the garment to be washed, and in the case that a metal object exists in the garment to be washed, it is judged that that garment to be washed meets the foreign matter recognition condition (Step S702).

In the application example, in the case that the garment to be washed meets the foreign matter recognition condition, it may be recognized that a foreign matter exists in the garment to be washed (Step S703). In the application example, the washing machine suspends work (Step S704). In the application example, a prompting voice "a foreign matter is detected in the garment to be washed, please handle it" is produced through a speaker of the washing machine (Step S705), meanwhile, a prompting content, for example, the foreign matter exists in the garment, is displayed on a display panel of the washing machine (Step S706), and a prompt, for example, voice and vibration prompts, may further be given through a smart mobile phone, associated with the washing machine, of the user (Step S707).

In the application example, after acquiring the scanned image of the garment to be washed through the X ray scanning part, the washing machine recognizes and analyzes a characteristic of the scanned image, and in the case that the image area is smaller than the area threshold value, when the metal sensing part of the washing machine detects no metal object existing in the garment to be washed, may judge that the garment to be washed does not meet the foreign matter recognition condition (Step S708). In the application example, it may be recognized that no foreign matter exists in the garment to be washed (Step S709). In the application example, the washing machine woks normally (Step S710).

According to the example of the present disclosure, it is detected whether the garment to be washed that is placed in the washing device meets the foreign matter recognition condition, and in the case that the foreign matter recognition condition is met, it is recognized that the foreign matter exists in the garment to be washed, and the prompt indicating existence of the foreign matter is given, so that the user is prompted to timely clean the foreign matter in the garment to be washed to avoid damage brought by the foreign matter.

Figure 8:
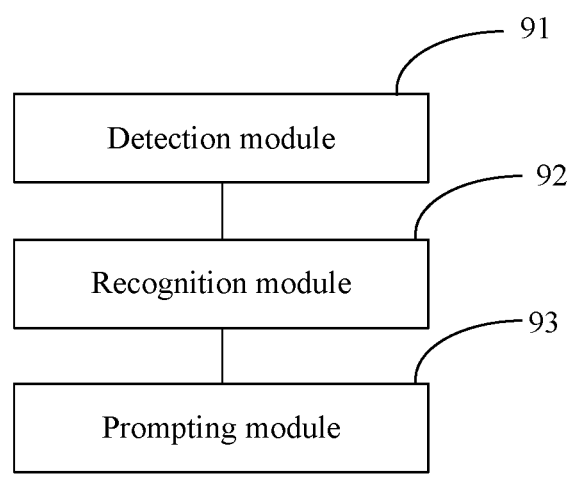
FIG. 8 is a block diagram of a foreign matter recognition device, according to an example.

FIG. 8 is a block diagram of a foreign matter recognition device, according to an example. The device includes a detection module 91, a recognition module 92 and a prompting module 93.

The detection module 91 is arranged to detect whether a garment to be washed that is placed in a washing device meets a foreign matter recognition condition.

The recognition module 92 is arranged to, in the case that the garment to be washed meets the foreign matter recognition condition, recognize that a foreign matter exists in the garment to be washed.

The prompting module 93 is arranged to give a prompt indicating existence of the foreign matter.

Figure 9:
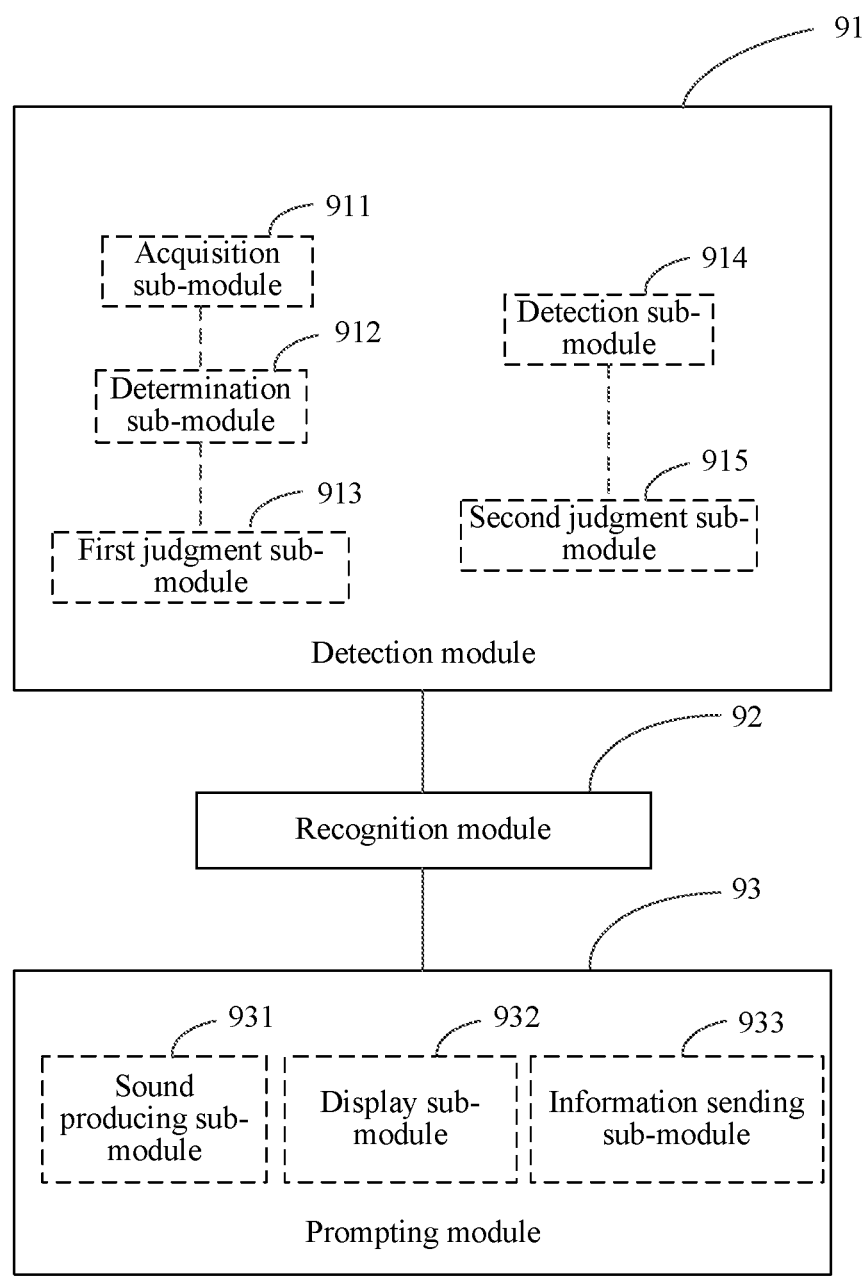
FIG. 9 is a block diagram of a foreign matter recognition device, according to an example.

FIG. 9 is a block diagram of a foreign matter recognition device, according to an example. In a possible implementation mode, referring to FIG. 9, the detection module 91 includes:

an acquisition sub-module 911 arranged to scan the garment to be washed to acquire a scanned image of the garment to be washed;

a determination sub-module 912 arranged to determine an image area in the scanned image that has a color depth larger than or equal to a depth threshold value; and a first judgment sub-module 913 arranged to, in the case that the image area has an area value larger than or equal to an area threshold value, judge that the garment to be washed meets the foreign matter recognition condition.

Referring to FIG. 9, in a possible implementation mode, the detection module 91 includes:

a detection sub-module 914 arranged to detect the garment to be washed through a metal sensing part; and a second judgment sub-module 91 arranged to, in the case that a metal object is detected to exist in the garment to be washed, judge that the garment to be washed meets the foreign matter recognition condition.

Referring to FIG. 9, in a possible implementation mode, the prompting module 93 includes:

a sound producing sub-module 931 arranged to produce a prompting sound through a sound producing part of the washing device.

Referring to FIG. 9, in a possible implementation mode, the prompting module 93 includes:

a display sub-module 932 arranged to display a prompting content on a display part of the washing device.

Referring to FIG. 9, in a possible implementation mode, the prompting module 93 includes:

an information sending sub-module 933 arranged to send prompting information to terminal equipment associated with the washing device for the terminal equipment to give a corresponding prompt.

With respect to the devices in the above examples, the specific manners for performing operations for individual modules therein have been described in detail in the examples regarding the methods, which will not be elaborated herein.

Figure 10:
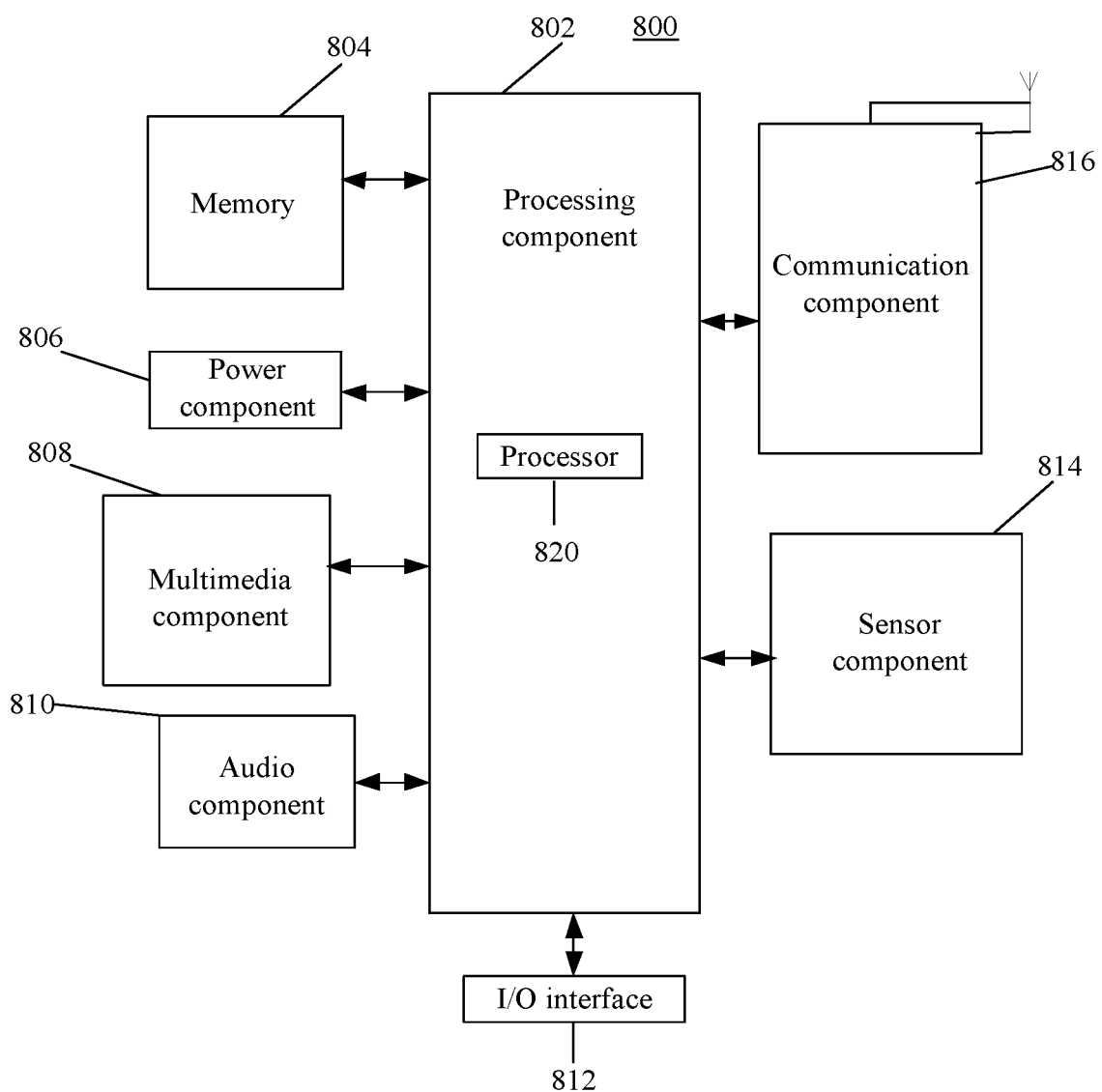
FIG. 10 is a block diagram of a foreign matter recognition device, according to an example.

FIG. 10 is a block diagram of a foreign matter recognition device, according to an example. For example, the device 800 may be a mobile phone, a computer, a digital broadcast terminal, a messaging device, a gaming console, a tablet, a medical device, exercise equipment, a personal digital assistant, and the like.

Referring to FIG. 10, the device 800 may include one or more of the following components: a processing component 802, a memory 804, a power component 806, a multimedia component 808, an audio component 810, an Input/Output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the steps in the abovementioned method. Moreover, the processing component 802 may include one or more modules which facilitate interaction between the processing component 802 and the other components. For instance, the processing component 802 may include a multimedia module to facilitate interaction between the multimedia component 1408 and the processing component 802.

The memory 804 is arranged to store various types of data to support the operation of the device 800. Examples of such data include instructions for any application programs or methods operated on the device 800, contact data, phonebook data, messages, pictures, video, etc. The memory 804 may be implemented by any type of volatile or non-volatile memory devices, or a combination thereof, such as an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 806 provides power for various components of the device 800. The power component 806 may include a power management system, one or more power supplies, and other components associated with the generation, management and distribution of power for the device 800.

The multimedia component 808 includes a screen providing an output interface between the device 800 and a user. In some examples, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also detect a duration and pressure associated with the touch or swipe action. In some examples, the multimedia component 808 includes a front camera and/or a rear camera. The front camera and/or the rear camera may receive external multimedia data when the device 800 is in an operation mode, such as a photographing mode or a video mode. Each of the front camera and the rear camera may be a fixed optical lens system or have focusing and optical zooming capabilities.

The audio component 810 is arranged to output and/or input an audio signal. For example, the audio component 810 includes a Microphone (MIC), and the MIC is arranged to receive an external audio signal when the device 800 is in the operation mode, such as a call mode, a recording mode and a voice recognition mode. The received audio signal may be further stored in the memory 804 or sent through the communication component 816. In some examples, the audio component 810 further includes a speaker arranged to output the audio signal.

The I/O interface 812 provides an interface between the processing component 802 and a peripheral interface module, and the peripheral interface module may be a keyboard, a click wheel, a button and the like. The button may include, but not limited to: a home button, a volume button, a starting button and a locking button.

The sensor component 814 includes one or more sensors arranged to provide status assessment in various aspects for the device 800. For instance, the sensor component 814 may detect an on/off status of the device 800 and relative positioning of components, such as a display and small keyboard of the device 800, and the sensor component 814 may further detect a change in a position of the device 800 or a component of the device 800, presence or absence of contact between the user and the device 800, orientation or acceleration/deceleration of the device 800 and a change in temperature of the device 800. The sensor component 814 may include a proximity sensor arranged to detect presence of an object nearby without any physical contact. The sensor component 814 may also include a light sensor, such as a Complementary Metal Oxide Semiconductor (CMOS) or Charge Coupled Device (CCD) image sensor, arranged for use in an imaging application. In some examples, the sensor component 814 may also include an acceleration sensor, a gyroscope sensor, a magnetic sensor, a pressure sensor or a temperature sensor.

The communication component 816 is arranged to facilitate wired or wireless communication between the device 800 and other equipment. The device 800 may access a communication-standard-based wireless network, such as a WIFI network, a 2nd-Generation (2G) or 3rd-Generation (3G) network or a combination thereof. In an example, the communication component 816 receives a broadcast signal or broadcast associated information from an external broadcast management system through a broadcast channel. In an example, the communication component 816 further includes a Near Field Communication (NFC) module to facilitate short-range communication. For example, the NFC module may be implemented on the basis of a Radio Frequency Identification (RFID) technology, an Infrared Data Association (IrDA) technology, an Ultra-WideBand (UWB) technology, a BT technology and another technology.

In an example, the device 800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is arranged to execute the above-mentioned method.

In an example, there is also provided a non-transitory computer-readable storage medium including an instruction, such as the memory 804 including an instruction, and the instruction may be executed by the processor 820 of the device 800 to implement the abovementioned method. For example, the non-transitory computer-readable storage medium may be a ROMa Compact Disc Read-Only Memory (CD-ROM), a magnetic tape, a floppy disc, optical data storage equipment and the like.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors.

Other examples of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only.

It will be appreciated that the present disclosure is not limited to the exact construction that has been described above and illustrated in the accompanying drawings, and that various modifications and changes may be made without departing from the scope thereof.

What is claimed is:

1. A foreign matter recognition method, comprising:
   detecting whether a garment to be washed that is placed in a washing device meets a foreign matter recognition condition;
   in the case that the garment to be washed meets the foreign matter recognition condition, recognizing that a foreign matter exists in the garment to be washed; and
   indicating existence of the foreign matter,
   wherein detecting whether the garment to be washed that is placed in the washing device meets the foreign matter recognition condition comprises:
      scanning the garment to be washed to acquire a scanned image of the garment to be washed;
      determining an image area in the scanned image that has a color depth that is larger than or equal to a depth threshold value, wherein the color depth of the scanned image is 0% to 100% from all white to all black; and
      in the case that the image area has an area value larger than or equal to an area threshold value, determining that the garment to be washed meets the foreign matter recognition condition such that the foreign matter being left in the garment is determined to exist in the garment, wherein the area threshold value represents a percentage value of the image area, and the foreign matter being left in the garment is determined to exist in the garment when both the color depth is larger than or equal to the depth threshold value and the image area has the area value that is larger than or equal to the area threshold value.

2. The method of claim 1, wherein detecting whether the garment to be washed that is placed in the washing device meets the foreign matter recognition condition further comprises:
   detecting the garment to be washed through a metal sensing part; and
   in the case that a metal object is detected to exist in the garment to be washed using the metal sensing part, determining that the garment to be washed meets the foreign matter recognition condition.

3. The method of claim 1, wherein indicating the existence of the foreign matter comprises: producing a prompting sound through a sound producing part of the washing device and playing the prompting sound.

4. The method of claim 1, wherein indicating the existence of the foreign matter comprises:
displaying a prompting content on a display part of the washing device.

5. The method of claim 1, wherein indicating the existence of the foreign matter comprises:
sending prompting information to a terminal device associated with the washing device for the terminal device to generate a corresponding prompt.

6. A foreign matter recognition device, comprising:
a processor; and
a memory arranged to store an instruction executable for the processor, wherein the processor is arranged to:
detect whether a garment to be washed that is placed in a washing device meets a foreign matter recognition condition;
in the case that the garment to be washed meets the foreign matter recognition condition, recognize that a foreign matter exists in the garment to be washed; and
indicate existence of the foreign matter, wherein detecting whether the garment to be washed that is placed in the washing device meets the foreign matter recognition condition comprises:
scanning the garment to be washed to acquire a scanned image of the garment to be washed;
determining an image area in the scanned image that has a color depth that is larger than or equal to a depth threshold value, wherein the color depth of the scanned image is 0% to 100% from all white to all black; and
in the case that the image area has an area value larger than or equal to an area threshold value, determining that the garment to be washed meets the foreign matter recognition condition such that the foreign matter being left in the garment is determined to exist in the garment, wherein the area threshold value represents a percentage value of the image area, and the foreign matter being left in the garment is determined to exist in the garment when both the color depth is larger than or equal to the depth threshold value and the image area has the area value that is larger than or equal to the area threshold value.

7. The device of claim 6, wherein, in order to detect whether the garment to be washed that is placed in the washing device meets the foreign matter recognition condition, the processor is further arranged to:
detect the garment to be washed through a metal sensing part; and
in the case that a metal object is detected to exist in the garment to be washed using the metal sensing part, determine that the garment to be washed meets the foreign matter recognition condition.

8. The device of claim 6, wherein, in order to indicate the existence of the foreign matter, the processor is arranged to:
produce a prompting sound through a sound producing part of the washing device and play the prompting sound.

9. The device of claim 6, wherein in order to indicate the existence of the foreign matter, the processor is arranged to:
display a prompting content on a display part of the washing device.

10. The device of claim 6, wherein in order to indicate the existence of the foreign matter, the processor is arranged to:
send prompting information to a terminal device associated with the washing device for the terminal device to generate a corresponding prompt.

11. A non-transitory computer-readable storage medium having stored thereon instructions that, when executed by a processor, cause the processor to implement:
detecting whether a garment to be washed that is placed in a washing device meets a foreign matter recognition condition;
in the case that the garment to be washed meets the foreign matter recognition condition, recognizing that a foreign matter exists in the garment to be washed, wherein the color depth of the scanned image is 0% to 100% from all white to all black; and
indicating existence of the foreign matter, wherein detecting whether the garment to be washed that is placed in the washing device meets the foreign matter recognition condition comprises:
scanning the garment to be washed to acquire a scanned image of the garment to be washed;
determining an image area in the scanned image that has a color depth that is larger than or equal to a depth threshold value; and
in the case that the image area has an area value larger than or equal to an area threshold value, determining that the garment to be washed meets the foreign matter recognition condition such that the foreign matter being left in the garment is determined to exist in the garment, wherein the area threshold value represents a percentage value of the image area, and the foreign matter being left in the garment is determined to exist in the garment when both the color depth is larger than or equal to the depth threshold value and the image area has the area value that is larger than or equal to the area threshold value.

12. The non-transitory computer-readable storage medium of claim 11, wherein the instructions caused the processor to implement detecting whether the garment to be washed that is placed in the washing device meets the foreign matter recognition condition further cause the processor to implement:
detecting the garment to be washed through a metal sensing part; and
in the case that a metal object is detected to exist in the garment to be washed using the metal sensing part, determining that the garment to be washed meets the foreign matter recognition condition.

13. The non-transitory computer-readable storage medium of claim 11, wherein the instructions caused the processor to implement indicating the existence of the foreign matter further cause the processor to implement:
producing a prompting sound through a sound producing part of the washing device and playing the prompting sound.

14. The non-transitory computer-readable storage medium of claim 11, wherein the instructions caused the processor to implement indicating the existence of the foreign matter further cause the processor to implement:
displaying a prompting content on a display part of the washing device.

15. The non-transitory computer-readable storage medium of claim 11, wherein the instructions caused the processor to implement indicating the existence of the foreign matter further cause the processor to implement:

sending prompting information to a terminal device associated with the washing device for the terminal device to generate a corresponding prompt.

\* \* \* \* \*